(12) United States Patent
Eliasson

(10) Patent No.: US 12,075,722 B2
(45) Date of Patent: Sep. 3, 2024

(54) CONTROL SIGNAL SENSING FOR A ROBOTIC WORK TOOL

(71) Applicant: Husqvarna AB, Huskvarna (SE)

(72) Inventor: Hans Eliasson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 433 days.

(21) Appl. No.: 17/325,766

(22) Filed: May 20, 2021

(65) Prior Publication Data

US 2021/0368674 A1 Dec. 2, 2021

(30) Foreign Application Priority Data

May 26, 2020 (SE) .................................. 2050605-1

(51) Int. Cl.
| | | |
|---|---|---|
| *A01D 34/00* | (2006.01) | |
| *A01D 69/02* | (2006.01) | |
| *A01D 101/00* | (2006.01) | |
| *G05D 1/00* | (2024.01) | |

(52) U.S. Cl.
CPC ........... *A01D 34/008* (2013.01); *A01D 69/02* (2013.01); *G05D 1/0214* (2013.01); *G05D 1/0223* (2013.01); *G05D 1/0274* (2013.01); *G05D 1/028* (2013.01); *A01D 2101/00* (2013.01)

(58) Field of Classification Search
None
See application file for complete search history.

(56) References Cited

U.S. PATENT DOCUMENTS

| | | | |
|---|---|---|---|
| 2013/0104509 A1* | 5/2013 | MacKinnon | A01D 34/78 |
| | | | 701/22 |
| 2015/0366130 A1 | 12/2015 | Bergström et al. | |
| 2017/0020064 A1 | 1/2017 | Doughty et al. | |
| 2017/0188510 A1* | 7/2017 | Einecke | H04N 7/183 |
| 2018/0263181 A1* | 9/2018 | Willgert | A01D 34/008 |
| 2019/0272462 A1* | 9/2019 | Franzius | G06F 17/18 |
| 2019/0357430 A1* | 11/2019 | Kraft | G05D 1/0212 |
| 2020/0033143 A1* | 1/2020 | Hiramatsu | G05D 1/0219 |
| 2021/0112708 A1* | 4/2021 | Kameyama | A01D 34/008 |
| 2021/0116911 A1* | 4/2021 | Pjevach | B60L 50/66 |

FOREIGN PATENT DOCUMENTS

| | | |
|---|---|---|
| CN | 110716542 A | 1/2020 |
| DE | 102012200445 A1 | 7/2013 |
| EP | 1488296 B1 | 4/2006 |
| EP | 2802950 B1 | 5/2017 |
| EP | 2586283 B1 | 7/2017 |
| EP | 3584661 A1 | 12/2019 |
| WO | 2003083593 A1 | 10/2003 |
| WO | 2019187122 A1 | 10/2019 |

OTHER PUBLICATIONS

Office Action and Search Report for Swedish Application No. 2050605-1 mailed on Jan. 21, 2021.

* cited by examiner

*Primary Examiner* — Jaime Figueroa
*Assistant Examiner* — Arslan Azhar
(74) *Attorney, Agent, or Firm* — Burr & Forman LLP

(57) ABSTRACT

A robotic work tool (100) comprising a controller (110), the controller (110) being configured to determine that an area, where there is an increased risk of impact to a surface travelled, is entered by the robotic work tool (100); and in response thereto reduce an acceleration utilized by the robotic work tool (100).

20 Claims, 3 Drawing Sheets

CONTROL SIGNAL SENSING FOR A ROBOTIC WORK TOOL

TECHNICAL FIELD

This application relates to robotic work tools and in particular to a system and a method for providing an improved control signal sensing for a robotic work tool, such as a lawn mower.

BACKGROUND

Automated or robotic power tools such as robotic lawn mowers are becoming increasingly more popular. In a typical deployment a work area, such as a garden, the robotic lawn mower is traversing the living grass. As is known, grass is sensitive to physical influences and the wheels of the robotic lawn mower 100 therefore easily leaves tread marks or tracks. Such tracks affect the overall look of the lawn and are unwanted by most garden owners.

The prior art therefore contains ample of proposals on how to reduce or prevent such tracks by not repeatedly travelling in the same places or by restricting the speed of the robotic lawn mower 100 to reduce the physical impact on the lawn.

However, these proposals are not sufficiently efficient as is obvious in that robotic lawn mowers still leave tracks even when implementing such techniques.

Thus, there is still a need for an improved manner of enabling a reduction in the physical impact of a robotic work tool on the surface travelled, in particular of a robotic lawn mower 100 on grass.

SUMMARY

As will be disclosed in detail in the detailed description, the inventors have realized—after inventive and insightful reasoning—that although reducing the speed that the robotic work tool travels at will reduce the damage caused by the robotic work tool on the surface travelled, it is not the speed that is decisive, and such measures are thus insufficient. Instead, the inventors have realized that a more relevant cause to this long-standing problem, is the actual forces imparted by the robotic work tool on the surface travelled, and the inventors are therefore proposing a manner for limiting those forces as will be discussed herein.

It is therefore an object of the teachings of this application to overcome or at least reduce those problems by providing a robotic work tool comprising a controller, the controller being configured to determine that an area, where there is an increased risk of impact to a surface travelled, is entered by the robotic work tool; and in response thereto reduce an acceleration utilized by the robotic work tool.

Benefits of such a robotic work tool will be discussed in the detailed description and includes, but are not limited to:
- increased maximum slope capacity;
- reduced wear of grass;
- reduced risk of slipping;
- reduced risk of wheels digging into the surface; and
- reduced risk of a multi-chassis robotic work tool experiencing so-called up-side-down situations.

In one embodiment the controller is further configured to reduce a turning degree utilized by the robotic work tool in response to determining that an area, where there is an increased risk of impact to a surface travelled, is entered by the robotic work tool.

In one embodiment the controller is further configured to determine that the area has been entered by determining that the robotic work tool is travelling at a slope exceeding a threshold slope value.

In one embodiment the robotic work tool further comprises a moisture sensor, and wherein the controller is further configured to determine that the area has been entered by determining that the robotic work tool is travelling a wet surface by receiving input indicting this from the moisture sensor.

In one embodiment the robotic work tool further comprises a memory configured to store at least one location corresponding to at least one area indicating an increased risk, and wherein the controller is further configured to determine that the area has been entered by determining a current location of the robotic work tool and compare the current location to the at least one location stored in the memory.

In one embodiment the controller is further configured to determine that the area has been entered by detecting wheel slip.

In one embodiment the robotic work tool further comprises an operating device, and wherein the controller is further configured to determine that the area has been entered by detecting that the load exerted on the operating device falls below a threshold power level.

In one embodiment the controller is further configured to reduce the acceleration based on a factor of the area.

In one embodiment the controller is further configured to reduce the acceleration until a condition giving rise to the determination that the robotic work tool is entering the area is no longer detectable.

In one embodiment the robotic work tool comprises at least one wheel and at least one motor arranged to drive the at least one wheel, wherein the controller is further configured to control the acceleration utilized by regulating a power level provided to at least one of the at least one motor.

In one embodiment the controller is further configured to control a turning degree utilized by regulating a power level provided to at least one of the at least one motor.

In one embodiment the robotic work tool is a robotic lawn mower.

It is also an object of the teachings of this application to overcome the problems by providing a method for use in a robotic work tool, the method comprising determining that an area where there is an increased risk of impact to a surface travelled is entered by the robotic work tool and in response thereto reduce an acceleration utilized by the robotic work tool.

It should be noted that the teachings herein are not simply related to changing a speed of a robotic work tool, but to change the impact of the robotic work tool by reducing the acceleration utilized by the robotic work tool. In this regard, it could be noted that adapting a speed may add to the impact of the robotic work tool as the robotic work tool will then need to accelerate and/or decelerate even in situations where such actions are not without impact. For example, a robotic work tool braking in a downward slope may in fact cause the wheels to start slipping and the robotic work tool sliding down the slope as a result.

It should also be noted that the teachings herein are not simply to detect wheel spin and adjust the speed of the robotic work tool accordingly, but to proactively reduce the acceleration (and possibly the angular speed) to avoid an impact of the robotic work tool, such as through wheel slippage.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein. Like reference numbers refer to like elements throughout.

It should be noted that even though the description given herein will be focused on robotic lawn mowers, the teachings herein may also be applied to, robotic ball collectors, robotic mine sweepers, robotic farming equipment, or other robotic work tools where lift detection is used and where the robotic work tool is susceptible to dust, dirt or other debris.

Figure 1A:
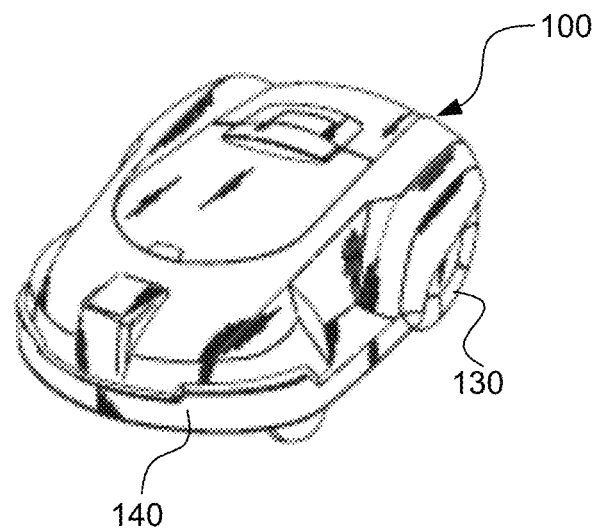
FIG. 1A shows an example of a robotic lawn mower according to one embodiment of the teachings herein.

FIG. 1A shows a perspective view of a robotic work tool 100, here exemplified by a robotic lawn mower 100, having a body 140 and a plurality of wheels 130 (only one side is shown). The robotic work tool 100 may be a multi-chassis type or a mono-chassis type (as in FIG. 1A). A multi-chassis type comprises more than one main body parts that are movable with respect to one another. A mono-chassis type comprises only one main body part.

The robotic lawn mower 100 may comprise charging skids for contacting contact plates (not shown in FIG. 1) when docking into a charging station (not shown in FIG. 1, but referenced 210 in FIG. 2) for receiving a charging current through, and possibly also for transferring information by means of electrical communication between the charging station and the robotic lawn mower 100.

Figure 1B:
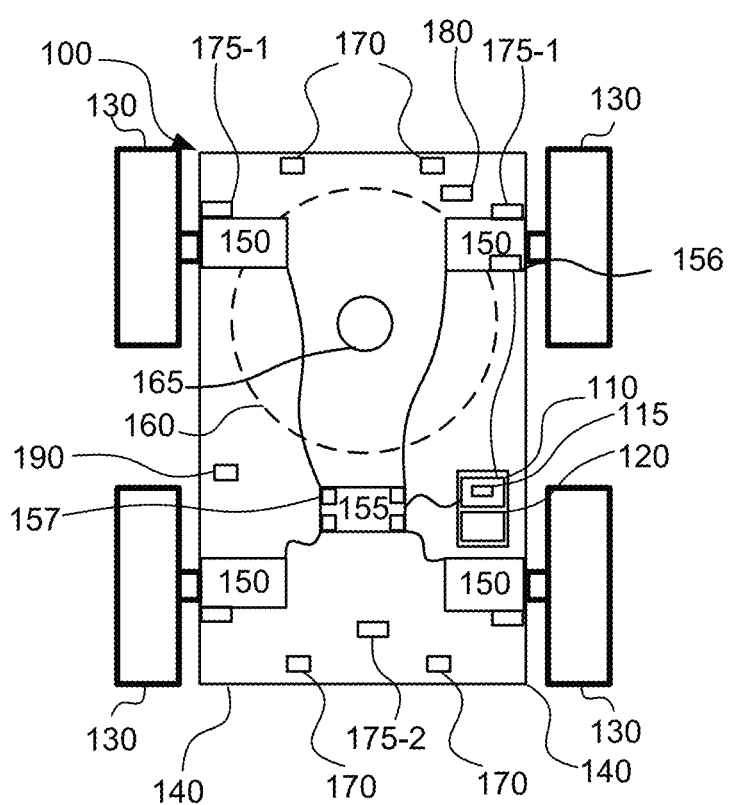
FIG. 1B shows a schematic view of the components of an example of a robotic work tool being a robotic lawn mower according to an example embodiment of the teachings herein.

FIG. 1B shows a schematic overview of the robotic work tool 100, also exemplified here by a robotic lawn mower 100. In this example embodiment the robotic lawn mower 100 is of a mono-chassis type, having a main body part 140.

The main body part 140 substantially houses all components of the robotic lawn mower 100. The robotic lawn mower 100 has a plurality of wheels 130. In the exemplary embodiment of FIG. 1B the robotic lawn mower 100 has four wheels 130, two front wheels and two rear wheels. At least some of the wheels 130 are drivably connected to at least one electric motor 150. It should be noted that even if the description herein is focused on electric motors, combustion engines may alternatively be used, possibly in combination with an electric motor. In the example of FIG. 1B, each of the wheels 130 is connected to a respective electric motor. This allows for driving the wheels 130 independently of one another which, for example, enables steep turning and rotating around a geometrical center for the robotic lawn mower 100. It should be noted though that not all wheels need be connected to each a motor, but the robotic lawn mower 100 may be arranged to be navigated in different manners, for example by sharing one or several motors 150. In an embodiment where motors are shared, a gearing system may be used for providing the power to the respective wheels and for rotating the wheels in different directions. In some embodiments, one or several wheels may be uncontrolled and thus simply react to the movement of the robotic lawn mower 100.

The robotic lawn mower 100 also comprises a grass cutting device 160, such as a rotating blade 160 driven by a cutter motor 165. The grass cutting device being an example of a work tool or operating device 160 for a robotic work tool 100. The robotic lawn mower 100 also has (at least) one battery 155 for providing power to the motor(s) 150 and/or the cutter motor 165.

The robotic lawn mower 100 also comprises a controller 110 and a computer readable storage medium or memory 120. The controller 110 may be implemented using instructions that enable hardware functionality, for example, by using executable computer program instructions in a general-purpose or special-purpose processor that may be stored on the memory 120 to be executed by such a processor. The controller 110 is configured to read instructions from the memory 120 and execute these instructions to control the operation of the robotic lawn mower 100 including, but not being limited to, the propulsion of the robotic lawn mower. The controller 110 may be implemented using any suitable, available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic lawn mower 100 may further be arranged with a wireless communication interface 115 for communicating with other devices, such as a server, a personal computer or smartphone, the charging station, and/or other robotic work tools. Examples of such wireless communication devices are Bluetooth®, WiFi® (IEEE802.11b), Global System Mobile (GSM) and LTE (Long Term Evolution), to name a few.

For enabling the robotic lawn mower 100 to navigate with reference to a boundary wire emitting a magnetic field caused by a control signal transmitted through the boundary wire, the robotic lawn mower 100 is further configured to have at least one magnetic field sensor 170 arranged to detect the magnetic field (not shown) and for detecting the boundary wire and/or for receiving (and possibly also sending) information to/from a signal generator (will be discussed with reference to FIG. 2). In some embodiments, the sensors 170 may be connected to the controller 110, possibly via filters and an amplifier, and the controller 110 may be configured to process and evaluate any signals received from the sensors 170. The sensor signals are caused by the magnetic field being generated by the control signal being transmitted through the boundary wire. This enables the controller 110 to determine whether the robotic lawn mower 100 is close to or crossing the boundary wire, or inside or outside an area enclosed by the boundary wire.

The robotic lawn mower 100 further comprises one or more sensors for deduced navigation 175. Examples of sensors for deduced reckoning are odometers, accelerometers, gyroscopes, and compasses to mention a few examples. In the example of FIG. 1B, the robotic lawn mower 100 comprises four odometers 175-1, being wheel turn counters (for illustrative purposes, only two of the odometers 175-1 are referenced in FIG. 2), enabling the robotic lawn mower 100 to count the number of wheel turns (partial or full) executed by for example two opposite wheels and thereby both determine a distance travelled (equalling number of wheel turns multiplied with the diameter of the wheel), and also any directional changes (by noting differences in wheel turns between the two wheels). The odometers 175-1 may also be used to determine any wheel slip, for example by noting that one wheel is rotating at a higher rotational speed than it is intended to rotate at, or, alternatively, that it is rotating faster than another wheel.

In the example of FIG. 1B, the robotic lawn mower 100 further comprises an inertial measurement unit (IMU) 175-2 enabling the robotic lawn mower 100 to not only determine directional changes, but also changes in altitude and current inclination. In one embodiment the IMU is one or more accelerometers. In one embodiment the IMU is one or more gyroscopes. In one embodiment the IMU is both one or more accelerometers and one or more gyroscopes.

The IMU175-2 also enables the robotic lawn mower 100 to determine movements in a sideways direction, for example caused by the robotic lawn mower 100 slipping or sliding. The IMU 175-2 may also be used to determine a current acceleration of the robotic lawn mower 100.

The odometers may be used to calculate the angle, distance, angular speed, speed, angular acceleration and acceleration but it can only be done in the ground plane. The IMU may be used for the same but in three dimension as they can calculate 3 different angles (roll pitch and yaw), angular speed and angular acceleration.

The odometer can be compared with the orientation from the IMU to get one more slip detection mechanism.

The robotic lawn mower 100 may also comprise a rain or other moisture sensor 180 configured to provide readings indicating if the surroundings are wet and/or if it is raining.

In one embodiment, the robotic lawn mower 100 may further comprise at least one navigation sensor, such as a beacon navigation sensor and/or a satellite navigation sensor 190. The beacon navigation sensor may be a Radio Frequency receiver, such as an Ultra Wide Band (UWB) receiver or sensor, configured to receive signals from a Radio Frequency beacon, such as a UWB beacon. Alternatively or additionally, the beacon navigation sensor may be an optical receiver configured to receive signals from an optical beacon. The satellite navigation sensor may be a GPS (Global Positioning System) device or other Global Navigation Satellite System (GNSS) device.

In embodiments, where the robotic lawn mower 100 is arranged with a navigation sensor, the magnetic sensors 170 are optional.

Returning to the motor(s) 150, in some embodiments at least one of the motors 150, is arranged with a sensor 156 that provides the controller 110 with sensor data representing a speed of the motor 150, and therefore of the wheel 130 connected to the motor and thus also a speed of the robotic lawn mower 100. As these speeds are proportional to one another, they will hereafter collectively be referred to simply as the speed.

In one embodiment the sensor 156 is a current sensor 156 that is arranged to provide data representing a frequency of the current over the motor 150, which is indicative of the speed.

In an alternative embodiment, the sensor 156 is a contactless sensor arranged to sense a characteristic representing the speed of the motor 150. Examples of such sensors are inductive, capacitive, photoelectric and ultrasonic. In one embodiment, the sensor 156 is a hall sensor.

As mentioned above, the controller is configured to control the operation and navigation of the robotic lawnmower 100. More precisely, the controller is configured to control the speed of a wheel 130 by controlling the motor of the wheel, and is thereby able to both steer and propel the robotic lawnmower 100. The speed is controlled by controlling the power supplied to or drawn by the motor 150 from the battery 155. The power may be regulated by controlling a power regulating device such as for example controlling a transistor 157 to open or allow current to pass from the battery 155 to the motor 150. In FIG. 1B four transistors are shown (for illustrational clarity only one transistor 157 is referenced), but it should be noted that other numbers and variations are possible.

In one embodiment the controller is arranged to control the power regulating device(s) so that a pulse width modulated signal is provided, wherein the power regulating device(s) are regulated to be fully opened or closed a fraction of the time so that a pulsed power signal is provided.

The controller 110 is thus configured to receive the sensor data indicating the speed of the motor 150 and in response thereto determine if the speed is changing at a desired rate, i.e. to determine if the acceleration is a desired or set acceleration. If the acceleration is too low, the controller regulates the power so that more power is supplied and if the acceleration is too high, the controller regulates the power so that less power is supplied.

In this manner, the controller 110 can adjust the acceleration that is utilized by regulating the power supplied to the motor(s) 150.

It should be noted that the description above is only one alternative manner of regulating the acceleration utilized. One alternative manner is to simply regulate the power supplied at different set levels corresponding to different accelerations.

However, common to all manners is that the controller 110 is configured to regulate the power supplied to the motor in order to achieve an acceleration that is to be utilized.

Furthermore, and as hinted to above, by providing different wheels (or rather the corresponding motors 150) with different power levels, the controller 110 can control the robotic lawnmower to turn and at what degree the turning is to be effected, even without actually turning the wheels 130 of the robotic lawnmower 100. The controller 110 is thus in some embodiments also configured to regulate the power supplied to different motors in order to achieve a degree of turning that is to be utilized. The degree of turning may relate to a turning radius and/or to a speed of turning (or angular speed). The degree of turning may also relate to an acceleration for turning, which acceleration may be for the robotic lawnmower (in which case it is an angular acceleration) or of an individual wheel to prevent that wheel from slipping or digging and thus preventing tread marks from being generated.

Figure 2:
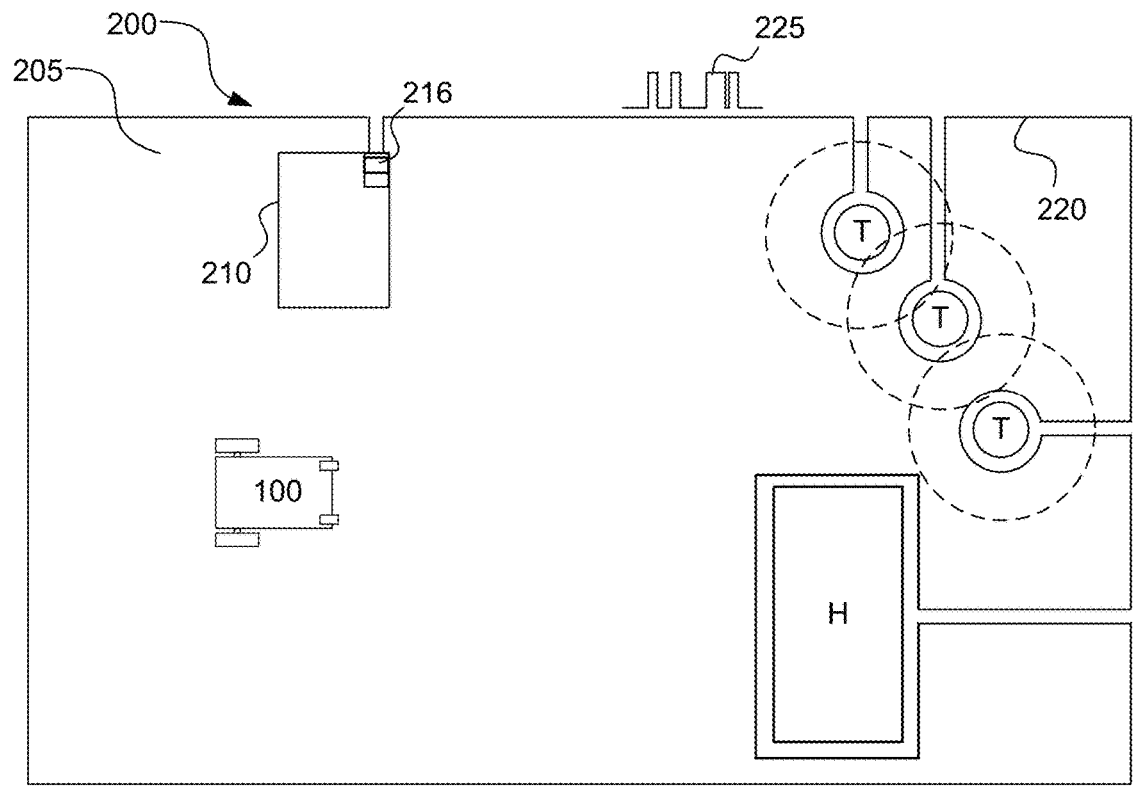
FIG. 2 shows an example of a robotic work tool system being a robotic lawn mower system according to an example embodiment of the teachings herein.

FIG. 2 shows a schematic view of a robotic work tool system 200 in one embodiment. The schematic view is not to scale. The robotic work tool system 200 comprises a robotic work tool 100. As with FIGS. 1A and 1B, the robotic work tool is exemplified by a robotic lawn mower, whereby the robotic work tool system may be a robotic lawn mower system or a system comprising a combinations of robotic work tools, one being a robotic lawn mower, but the teachings herein may also be applied to other robotic work tools adapted to operate within a work area.

The robotic work tool system 200 may also comprises charging station 210 which in some embodiments is arranged with a signal generator 215 and a boundary wire 220.

The signal generator is arranged to generate a control signal 225 to be transmitted through the boundary wire 220. To perform this, the signal generator is arranged with a controller and memory module 216. The controller and memory module 216 operates and functions in the same manner as the controller 110 and memory 120 of the robotic work tool 100. The controller and memory module 216 may also be the controller and memory module of the charging station, hereafter simply referred to as the controller 216.

In one alternative or additional embodiment the controller and memory module 216 may also comprise or be connected to a communication interface (not shown explicitly but considered to be part of the controller and memory module). The communication interface is enabled for communicating with other devices, such as a server, a personal computer or smartphone, a robotic work tool 100, another signal generator 215 and/or another charging station 210 using a wireless communication standard. Examples of such wireless communication standards are Bluetooth®, WiFi® (IEEE802.11b), Global System Mobile (GSM) and LTE (Long Term Evolution), to name a few.

The boundary wire 220 is arranged to enclose a work area 205, in which the robotic lawn mower 100 is supposed to serve. The control signal 225 transmitted through the boundary wire 220 causes a magnetic field (not shown) to be emitted.

In one embodiment the control signal 225 is a sinusoid periodic current signal. In one embodiment the control signal 225 is a pulsed current signal comprising a periodic train of pulses. In one embodiment the control signal 225 is a coded signal, such as a CDMA signal.

The robotic work tool system 200 may also optionally comprise at least one beacon (not shown) to enable the robotic lawn mower to navigate the work area using the beacon navigation sensor(s) 190. As an electrical signal is transmitted through a wire, such as the control signal 225 being transmitted through the boundary wire 220, a magnetic field is generated. The magnetic field may be detected using field sensors, such as Hall sensors. A sensor—in its simplest form—is a coil surrounding a conductive core, such as a ferrite core. The amplitude of the sensed magnetic field is proportional to the derivate of the control signal. A large variation (fast and/or of great magnitude) results in a high amplitude for the sensed magnetic field.

The variations are sensed and compared to a reference signal or pattern of variations in order to identify and thereby reliably sense the control signal.

The work area 205 is in this application exemplified as a garden, but can also be other work areas as would be understood. The garden contains a number of obstacles (O), exemplified herein by a number (3) of trees (T) and a house structure (H). The trees are marked both with respect to their trunks (filled lines) and the extension of their foliage (dashed lines).

As has been mentioned in the above, it is the actual forces imparted by the robotic lawn mower 100 on the lawn travelled this gives rise to the damage on the grass, which in turn causes the tread marks to occur. The inventors are therefore proposing a solution where the robotic lawn mower 100 is configured to adapt the operation of the robotic lawn mower 100 depending on environmental factors, such that the robotic lawn mower 100 imparts weaker forces onto the grass in environments where there is an added risk of causing damage to the grass.

Figure 3:
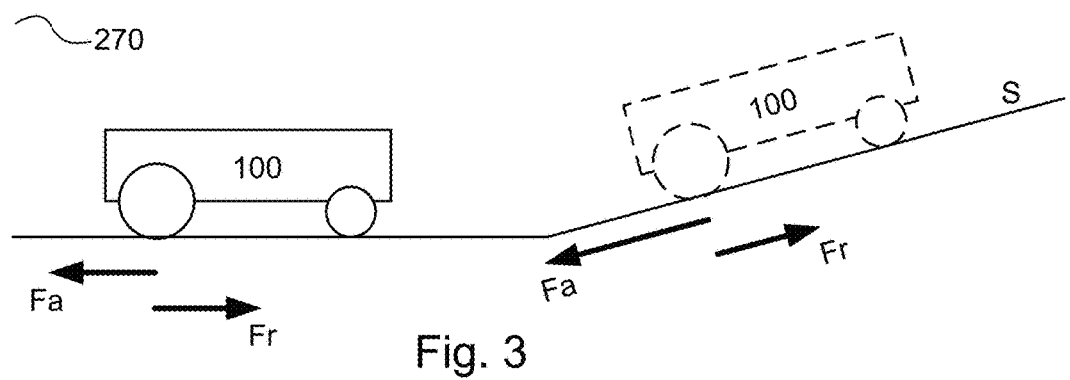
FIG. 3 shows a schematic view of a robotic work tool and how it affects a surface travelled when travelling in a straight line.

FIG. 3 shows a schematic view of a robotic lawn mower 100 and how it affects a surface travelled when travelling in a straight line. The force imparted by the robotic lawn mower 100 on the surface is shown schematically by an arrow denoted Fa (indicating the acceleration force, being the main component of the force imparted on the surface). The reactive force on the surface is also shown schematically by an arrow denoted Fr. The amount of reactive force that the surface can provide is limited and if the force imparted by the robotic lawn mower 100 exceeds the maximum reactive force, then the robotic lawn mower 100 will damage or otherwise the surface as the wheels will start slipping or digging into the surface, ripping it apart. The default acceleration of the robotic lawn mower 100 is therefore chosen so that it does not exceed the maximum reactive force available in most situations. This is indicated by the arrow indicating the imparted force Fa is the same length as the arrow indicating the reactive force Fr.

As is indicated, when the robotic lawn mower 100 enters an area where there is an added risk of impacting the surface, the imparted force becomes larger than the maximum reactive force. In the example of FIG. 3A, the robotic lawn mower 100 has entered a slope S, and the imparted force Fa has therefore increased as a component of the gravitational pull is now also added to the force imparted. This is indicated by the arrow indicating the imparted force Fa is now longer than the arrow indicating the reactive force Fr. This will result in the grass being impacted and/or that the robotic lawn mower 100 will start slipping or sliding down the slope, adding to the damage caused to the surface.

The robotic lawn mower 100 is therefore configured to determine that the robotic lawn mower 100 is entering an area where there is added risk of impacting the surface, and in response thereto adapting the operation of the robotic lawn mower 100 by reducing the acceleration of the robotic lawn mower 100.

In one such embodiment the environmental factor is that a slope (or gradient) of the surface being travelled has been detected (for example by the IMU 175-2 or other deduced reckoning sensor), wherein the slop exceeds a threshold slope value. In one embodiment the threshold slope value is 5%, 10%, 15% or in any of the ranges 0-5%, 0-10%, 5-15%.

In another or alternative such embodiment the environmental factor is that it has been detected that the lawn is wet. In one embodiment the robotic lawn mower 100 is configured to determine that the lawn is wet by receiving sensor input from the rain (or other moisture) sensor 180.

In another or alternative such embodiment the environmental factor is that it has been detected that the lawn is comprised of thin grass. In one embodiment the robotic lawn mower 100 is configured to determine that the lawn is comprised of thin grass by detecting a reduction or low level of the load exerted on the cutting device 160 of the robotic lawn mower 100. A low level of load may be determined as a power level falling below a threshold level.

In another or alternative such embodiment the environmental factor is that it has been detected that slipping has been (repeatedly) detected previously in the area currently being travelled. In one such embodiment, the controller 110 is configured to detect slipping and then noting the current location of the robotic lawn mower 100 and storing the location in the memory 120 of the robotic lawn mower 100, possibly in a virtual map application. In one such embodiment the controller 110 is configured to determine a current location of the robotic lawn mower 100 and compare the current location to locations stored in the memory to ascertain if an area where there is added risk has been entered.

The controller 110 may detect slipping by receiving input from the odometers 175-1 indicating wheel slip. The controller 110 may alternatively or additionally detect slipping by receiving input from the IMU indicating slipping or sliding of the robotic lawn mower 100.

In another or alternative such embodiment the environmental factor is that it has been detected that the robotic lawn mower 100 has entered an area which is indicated to be an area of increased risk, by determining a current location of the robotic lawn mower 100 and compare the current location to a virtual map stored in the memory of the robotic lawn mower100. The location may be determined utilizing the navigation sensor 190 and/or the deduced reckoning sensors 180. The map may comprise areas that have been detected previously to be areas of increased risk. The map may also or alternatively comprise areas that have been indicated by a user to be areas of increased risk. The areas may be indicated through a user interface of the robotic lawn mower 100 or more likely through a remote device (not shown) arranged to communicate with the robotic lawn mower 100 through the communication interface 115

In one embodiment the amount that the acceleration is reduced is a constant. In one embodiment, the amount is 25-50% of the default acceleration.

In one embodiment the amount that the acceleration is reduced is based on a factor of the environment or area. In one such embodiment, the factor is the current slope, where a higher slope results in a lower acceleration. The acceleration may then be reduced proportionally to the slope. In an alternative or additional such embodiment, the factor is the current moisture level, where a moisture level results in a lower acceleration.

In one embodiment the acceleration is reduced until a condition giving rise to the determination that the robotic lawn mower 100 is entering the area is no longer relevant i.e. detectable. The determination that the robotic lawn mower 100 is entering the area is thus based on that the condition is detectable. In one such embodiment the condition is that wheel slip is detected and the acceleration may then be decreased until the wheel slip is no longer detected. The condition may be detectable by a factor exceeding a threshold level.

The teachings herein will thus prevent or at least reduce the damage imparted by a robotic lawn mower 100 on the grass in areas close to obstacles and around the boundary (wire) as those are areas where the robotic lawn mower 100 will (decelerate and) accelerate often. The teachings herein are especially beneficial if such areas are in environments where there is an increased risk of damage, such as areas of increased risk (slopes for example) or in rainy or otherwise wet environments.

It should be noted that when referring to a reduction of the acceleration it should be understood that it is the absolute value of the acceleration that is reduced. As is known, a negative acceleration is a deceleration and it should be understood that the robotic lawn mower's deceleration may also be decreased in situations where it is stated that the acceleration is reduced. As the deceleration affects the stopping distance of the robotic lawn mower, the deceleration is only reduced in situations where it is allowed by standards. Alternatively, the deceleration may be reduced in situations where the stopping distance is regulated by initiating the deceleration earlier, thereby keeping the stopping distance within the bounds provided by the regulating standard.

As would be understood, the schematic illustrations of FIG. 3A does not tell the whole story or all components involved, but is sufficient for explaining how the teachings herein provides for an improved operation of a robotic lawn mower, as a skilled person would understand.

The inventors have further realized, that it is not only the linear propulsion of the robotic lawn mower 100 that is relevant to the physical impact of the robotic lawn mower 100 on the grass.

Similar to the situation in FIG. 3A a robotic lawn mower 100 affects a surface travelled when travelling in a curved line such as when turning through the centrifugal force exerted by the robotic lawn mower 100 which must be countered by a centripetal force. As would be understood, if the centrifugal force is larger than the centripetal force that can be provided or withstood by the surface, the robotic lawn mower 100 will impact the grass. The robotic lawn mower 100 is therefore also, in one embodiment, configured to adapt the operation of the robotic lawn mower 100 by reducing the angular speed of the robotic lawn mower 100 based on environmental factors. The environmental factors are the same as discussed above in relation to reducing the acceleration of the robotic lawn mower 100. In one such embodiment, the robotic lawn mower 100 is configured to reduce the angular speed of the robotic lawn mower 100 by increasing the turning radius of the robotic lawn mower 100. In one alternative or additional such embodiment, the robotic lawn mower 100 is configured to reduce the angular speed of the robotic lawn mower 100 by decreasing the turning speed of the robotic lawn mower 100.

As would be realized by a skilled person after having taken part of the teachings herein, the actual speed of the robotic lawn mower 100 is thus of less concern for the creation of tread marks and a robotic lawn mower 100 utilizing the teachings herein may thus even be more efficient even when reducing the (risk of) damage to the grass.

The teachings herein also has a benefit in that any slip or risk of slipping of the robotic lawn mower 100 will be greatly reduced which provides for both reduced wear and tear of the surface travelled, as well as a more controlled (and safer) navigation of the robotic lawn mower 100.

In the description above, reference is made to reducing angular speeds and reducing accelerations. However, as a skilled person would understand, a robotic lawn mower is not constantly accelerating or turning, and the teachings herein should therefore be understood as that the robotic lawn mower 100 is arranged to reduce the acceleration utilized during accelerations and, similarly, reduce the turning speed utilized during turning.

Figure 4:
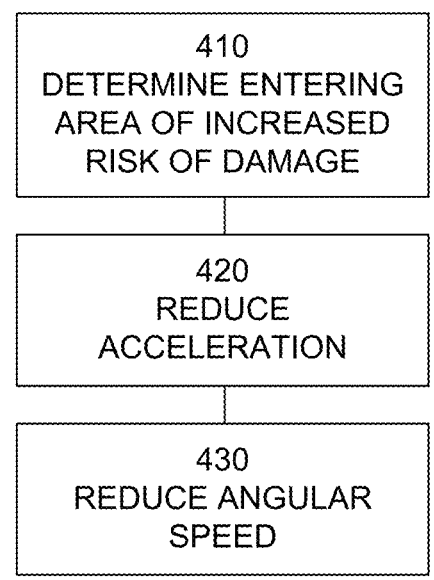
FIG. 4 shows a corresponding flowchart for a method according to an example embodiment of the teachings herein.

FIG. 4 shows a flowchart of a general method according to the teachings herein. As is discussed above, the robotic lawn mower detects that it enters 410 an area where there is an increased risk of impact to a surface travelled and in response thereto reduces 420 an acceleration utilized by the robotic work tool (100). Alternatively, the robotic lawn mower may also reduce 430 an angular speed utilized by the robotic lawn mower 100.

The invention claimed is:
1. A robotic work tool comprising:
a first driven wheel on a first side of the robotic work tool,
a second driven wheel on a second side of the robotic work tool, and
a controller, the controller being configured to:
guide the robotic work tool entering an area;
employ a sensor suite to acquire data of the area;
determine, based on the data from the sensor suite, that there is an increased risk of a loss of traction event in the area;
evaluate current wheel acceleration, on an individual wheel basis, to determine an amount of adjustment to the current wheel acceleration of at least one of the first driven wheel or the second driven wheel based on the increased risk of a loss of traction event in the area; and
modify the current wheel acceleration of at least one of the first driven wheel or the second driven wheel based on the amount of adjustment,
wherein the controller is further configured to determine that that there is the increased risk of the loss of traction event in the area by detecting that a load exerted on an operating device of the robotic work tool falls below a non-maximum threshold power level, and
wherein responsive determining that that there is the increased risk of the loss of traction event in the area by detecting that a load exerted on the operating device falls below a non-maximum threshold power level, the controller is configured to modify the current wheel acceleration by reducing the current wheel acceleration of at least one of the first driven wheel or the second driven wheel.

2. The robotic work tool according to claim 1, wherein the controller is further configured to reduce a turning degree of at least one of the first driven wheel or the second driven wheel by the robotic work tool in response to determining the increased risk of the loss of traction event in the area.

3. The robotic work tool according to claim 2, wherein at least one of the first driven wheel or the second driven wheel comprises at least one motor arranged to drive the at least one of the first driven wheel or the second driven wheel, wherein the controller is further configured to control the current wheel acceleration of the at least one of the first driven wheel or the second driven wheel by regulating a power level provided to at least one of the at least one motor.

4. The robotic work tool according to claim 3, wherein the controller is further configured to control a turning degree of the at least one of the first driven wheel or the second driven wheel by regulating a power level provided to at least one of the at least one motor.

5. The robotic work tool according to claim 1, wherein the controller is further configured to determine that there is the increased risk of the loss of traction event in the area by determining that the robotic work tool is travelling at a slope exceeding a threshold slope value.

6. The robotic work tool according to claim 1, wherein the robotic work tool further comprises a moisture sensor, and wherein the controller is further configured to determine that there is the increased risk of the loss of traction event in the area by determining that the robotic work tool is travelling a wet surface by receiving input indicting wetness from the moisture sensor.

7. The robotic work tool according to claim 1, further comprising a memory configured to store at least one location corresponding to at least one area in which the controller determined that there is the increased risk of the loss of traction event in the area, and wherein the controller is further configured to determine that there is the increased risk of the loss of traction event in the area by determining a current location of the robotic work tool and compare the current location to the at least one location stored in the memory.

8. The robotic work tool according to claim 1, wherein the controller is further configured to determine that that there is the increased risk of the loss of traction event in the area by detecting wheel slip.

9. The robotic work tool according to claim 1, wherein the controller is further configured to reduce the acceleration based on a factor of the area.

10. The robotic work tool according to claim 1, wherein the controller is further configured to reduce the acceleration until a condition giving rise to the determination that the robotic work tool has the increased risk of the loss of traction event in the area is no longer detectable.

11. The robotic work tool according to claim 1, wherein the robotic work tool is a robotic lawn mower.

12. The robotic work tool according to claim 1, wherein the operating device is a cutting blade.

13. A method for use in a robotic work tool, the method comprising:
guiding the robotic work tool entering an area;
employing a sensor suite to acquire data of the area;
determining, based on the data from the sensor suite, that there is an increased risk of a loss of traction event in the area;
evaluating current wheel acceleration, on an individual wheel basis, to determine an amount of adjustment to the current wheel acceleration of at least one of a first driven wheel or a second driven wheel based on the increased risk of a loss of traction event in the area; and
modifying the current wheel acceleration of at least one of the first driven wheel or the second driven wheel based on the amount of adjustment,
wherein the method further determines that that there is the increased risk of the loss of traction event in the area by detecting that a load exerted on an operating device of the robotic work tool falls below a non-maximum threshold power level, and
wherein responsive to determining that that there is the increased risk of the loss of traction event in the area by detecting that a load exerted on the operating device falls below a non-maximum threshold power level, the controller is configured to modify the current wheel acceleration by reducing the current wheel acceleration of at least one of the first driven wheel or the second driven wheel.

14. The method according to claim 13, further comprising reducing a turning degree of at least one of the first driven wheel or the second driven wheel by the robotic work tool in response to determining that there is the increased risk of the loss of traction event in the area.

15. The method according to claim 13, further comprising determining that there is the increased risk of the loss of traction event in the area by determining that the robotic work tool is travelling at a slope exceeding a threshold slope value.

16. The method according to claim 13, further comprising determining that there is the increased risk of the loss of traction event in the area by determining that the robotic work tool is travelling a wet surface by receiving input indicting wetness from a moisture sensor.

17. The method according to claim 13, further comprising storing at least one location corresponding to at least one area in which the controller determined that there is the increased risk of the loss of traction event in the area in a memory, and determining that the area has been entered by determining a current location of the robotic work tool and comparing the current location to the at least one location stored in the memory.

18. The method according to claim 13, further comprising determining that there is the increased risk of the loss of traction event in the area by detecting wheel slip.

19. The method according to claim 13, further comprising reducing the acceleration based on a factor of the area.

20. The method according to claim 13, wherein the operating device is a cutting blade.

* * * * *

UNITED STATES PATENT AND TRADEMARK OFFICE
CERTIFICATE OF CORRECTION

| | | |
|---|---|---|
| PATENT NO. | : 12,075,722 B2 | Page 1 of 1 |
| APPLICATION NO. | : 17/325766 | |
| DATED | : September 3, 2024 | |
| INVENTOR(S) | : Hans Eliasson | |

It is certified that error appears in the above-identified patent and that said Letters Patent is hereby corrected as shown below:

In the Claims

In Column 11, Claim 1, Line 26, "that that there" should read --that there--.

In Column 11, Claim 1, Line 30, "that that there" should read --that there--.

In Column 12, Claim 8, Line 12, "that that there" should read --that there--.

In Column 12, Claim 13, Line 42, "that that there" should read --that there--.

In Column 12, Claim 13, Line 47, "that that there" should read --that there--.

Signed and Sealed this
Eighteenth Day of March, 2025

Coke Morgan Stewart
*Acting Director of the United States Patent and Trademark Office*